United States Patent [19]

Chopra et al.

[11] Patent Number: 6,156,289
[45] Date of Patent: Dec. 5, 2000

[54] IRON BASED ROOFING GRANULES AND METHOD OF COLORING SAME

[75] Inventors: Manjit S. Chopra; Michael D. Vick, both of Tucson, Ariz.

[73] Assignee: Minerals Research & Recovery, Inc., Tucson, Ariz.

[21] Appl. No.: 08/150,559

[22] Filed: Nov. 10, 1993

Related U.S. Application Data

[63] Continuation of application No. 07/722,310, Jun. 27, 1991, abandoned.

[51] Int. Cl.[7] .............................. C01G 49/02; E04D 1/00
[52] U.S. Cl. ........................ 423/633; 428/143; 428/145; 428/150; 428/149; 75/353; 75/354; 52/518; 52/554; 52/555
[58] Field of Search ..................... 428/143, 145, 428/150, 149; 423/633; 75/353, 354; 52/518, 554, 555

[56] References Cited

U.S. PATENT DOCUMENTS

| | | | |
|---|---|---|---|
| 927,644 | 7/1909 | Doherty | 423/633 |
| 1,888,464 | 11/1932 | Lofland | 423/633 |
| 2,092,567 | 9/1937 | Wright | 428/150 |
| 2,197,895 | 4/1940 | Nichols | 428/150 |
| 2,705,188 | 3/1955 | Swaney | 423/633 |
| 3,341,347 | 9/1967 | Lewis et al. | 423/633 |
| 3,490,958 | 1/1970 | Robbinson | 148/20.3 |
| 3,752,696 | 8/1973 | Beyard | 117/100 |
| 3,888,683 | 6/1975 | Horai, Jr. et al. | 106/15 |
| 3,888,684 | 6/1975 | Little | 106/15 |
| 3,894,877 | 7/1975 | Nelson | 106/18 |
| 4,359,505 | 11/1982 | Joedicke | 428/404 |
| 4,582,425 | 4/1986 | Rubine et al. | 356/36 |

FOREIGN PATENT DOCUMENTS

| | | |
|---|---|---|
| 695235 | 9/1964 | Canada . |
| 757589 | 4/1967 | Canada . |
| 791081 | 7/1968 | Canada . |
| 824083 | 9/1969 | Canada . |
| 839206 | 4/1970 | Canada . |
| 894748 | 3/1972 | Canada . |
| 1016305 | 3/1974 | Canada . |

*Primary Examiner*—William P. Watkins, III
*Attorney, Agent, or Firm*—Shook, Hardy & Bacon L.L.P.

[57] ABSTRACT

Method of preparing colored roofing granules (18) from granulated mineral-containing matter having an elemental iron content of about 15% to about 70% is disclosed. The method comprises heating the granules (18) to a temperature of from about 450° C. to about 1,000° C. and maintaining the temperature for a period of time sufficient to effect a color change in the granules. The resulting oxidized granules are permanently colored and will not fade in use.

4 Claims, 1 Drawing Sheet

IRON BASED ROOFING GRANULES AND METHOD OF COLORING SAME

This is a continuation of application Ser. No. 07/722,310 filed on Jun. 27, 1991, now abandoned.

BACKGROUND OF THE INVENTION

1. Field of the Invention

The present invention is broadly concerned with an improved method of preparing roofing granules which effects a permanent color change that resists fading. More particularly, it is concerned with a method in which roofing granules are prepared from granulated mineral-containing matter having an iron content of about 15% to about 70% by weight to yield buff, brown or reddish-brown color. The granules are heated to a temperature of from about 450° C. to about 1,000° C. for a period of time sufficient to effect a color change.

2. Description of the Prior Art

Roofing granules are commonly used as a surface coating for composition substrate roofing materials. In conventional methods, pigments are applied in order to achieve popular color shades. Typically, the granules are coated with pigments in inorganic binders in the presence of clay or other fillers and reactants.

Once applied as a surface coating to composition roofing material and installed on a roof, such colored granules may have a tendency to fade. After exposure to the elements over a period of time, the extent of such fading may be of sufficient magnitude to preclude aesthetically satisfactory patching of the roof with new materials.

The method of the present invention utilizes the chemical composition of the granules to produce a permanent color change through heat treatment without the use of artificial dyes or pigments.

SUMMARY OF THE INVENTION

The present invention provides a greatly improved method for permanently coloring roofing granules. Use of the method of the invention provides an extremely simplified process which economically colors roofing granules in the shades of brown and reddish-brown described earlier. Fading of the granules is virtually eliminated, thus enhancing their utility as a surface coating for composition and other types of roofing material.

The method in accordance with the present invention involves heating granules of mineral-containing matter having a satisfactory iron content to a predetermined temperature and maintaining the temperature for a period of time sufficient to effect a color change. Addition of oxygen or water vapor during the heating step has been found to be particularly useful in producing additional color shades.

The preferred granulated mineral-containing matter contains an initial iron content (prior to oxidation) of from about 15% to about 70% by weight. Most preferably, the source is copper slag, which may be economically obtained from copper smelting and which has an iron content of approximately 30% to 35% by weight.

The granules are heated to a temperature of from about 450° C. to 1,000° C. and are maintained at the elevated temperature for a period of time sufficient to oxidize the iron and thus to effect a color change in the granules. The time will vary from about 2 to about 60 minutes. The heating may be in an unaltered atmosphere or one which is oxygen enriched, or enriched with water vapor or steam, or a combination of the foregoing, depending on the granule color desired.

Where the desired product is roofing granules to be sold as a commodity, they are cooled and packaged. Alternatively, the granules may be applied directly after the coloring treatment (with or without cooling) to a composition roofing material substrate as a surface coating.

DESCRIPTION OF THE PREFERRED EMBODIMENTS

Figure 1:
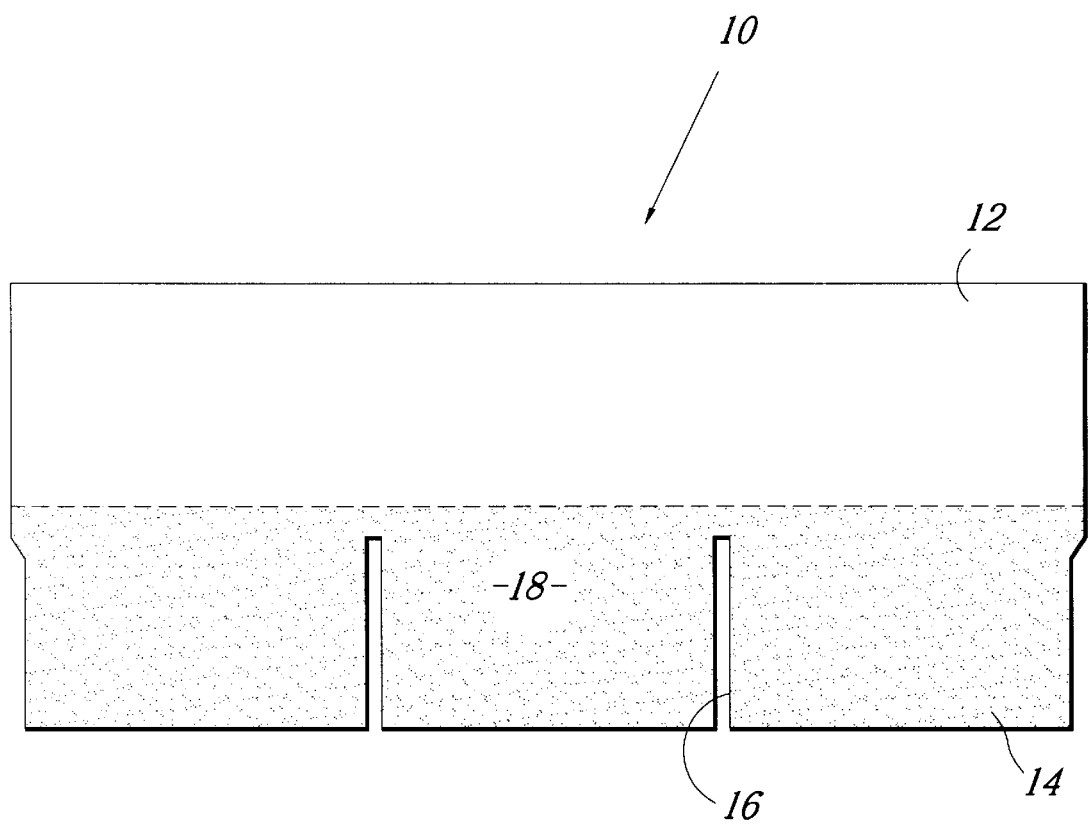
FIG. 1 is an elevational view of a shingle making use of roofing granules described in the invention, as a surface coating.

Referring now to the drawing, a representative composition roofing material in accordance with the present invention is illustrated in FIG. 1. Shingle (10) includes lap area (12), tab area (14), and notch (16). The shingle may be made from any one of various known materials including bituminous substances and manmade formulations, all to be generally referred to as composition roofing material. The surface of tab area (14) is coated with granules (18). When tab area (14) is coated with granules (18) prepared in accordance with the method of the present invention, the finished roof presents a permanently colored, fade-proof granular surface.

In accordance with a preferred procedure, mineral-containing matter with an iron content of about 15% to about 70% is used for preparing the base granules. The iron content is preferably uniformly distributed throughout the mineral-containing matter in order to impart uniform coloration to the finished, heat-treated granules. Depending upon the iron content of the base granules, and the exact coloring procedure followed, the color of the product granules may vary from buff to reddish-brown.

The base granules may be obtained from copper or other mineral slags such as boiler slag, nickel slag, as well as rock granules, or any other suitable matter. Granules obtained from copper slag are particularly preferred. The starting material is crushed to present small, uniform granules which are preferably small enough for 100% to pass through a number 8 U.S. Standard Sieve, and for no more than 2% (of the original sample) to pass through a number 40 U.S. Standard Sieve. Those skilled in the art will appreciate that other suitable particle sizes which may be useful for other roofing applications may be used.

The granules are heated in a furnace such as a rotary kiln, fluidized bed kiln, or stationary muffle furnace to a temperature of about 400° C. to about 1,000° C. For commercial applications a countercurrent rotating open flame kiln with a continuous feed mechanism is preferred. However, any suitable furnace may be used. The granules are maintained at the elevated temperature for a period of time sufficient to oxidize the iron and effect a color change in the granules, preferably from about 2 to about 60 minutes. However, those skilled in the art will appreciate that longer dwell times may also be used.

Oxidation of the iron in the granules may be in an unenriched or oxygen-enriched atmosphere. The iron or lower oxides of iron are converted to ferric oxide ($Fe_2O_3$) by a chemical reaction represented by the following equation:

$$6FeO + 4Fe_3O_4 + 2O_2 \rightarrow 2Fe_3O_4 + 6Fe_2O_3$$

The resulting granules are of a generally brownish color. The particular hue of brown within a broad spectrum is determined by the dwell time and the temperature.

Where the granules are heated in an atmosphere enriched with water vapor or steam, the iron and iron compounds are converted to a mixture of ferric oxide ($Fe_2O_3$) and hydrated iron oxides ($Fe_2O_3 \cdot nH_2O$) by a chemical reaction represented by the equation:

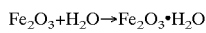

in which ferric oxide is oxidized to a lepidocrocite compound which is blood red in color, or to a Goethite compound which is brown, reddish, or yellowish in color, or to a combination of the two.

Alternatively, the ferric oxide may be hydrated to a limonite compound which is brown, or brownish black in color, or to hydrohematite, which is probably an intimate mixture of Goethite and Hematite and which is red in color. The chemical reaction is represented by the equation:

$$Fe_2O_3 + nH_2O \rightarrow Fe_2O_3 \cdot nH_2O$$

It is to be understood that the foregoing expressed reactions are likely to be an oversimplification of the actual chemistry involved in the process of the invention. As this chemistry is not fully understood, applicants do not intend to be limited to any particular chemical mechanism that may take place when the steps of the Method of the Invention are practiced.

Coloration of the granules by the method of the present invention yields a wide range of buffs, browns and reddish-brown colors similar to standard roofing colors. The coloration is substantially permanent. That is to say, it is extremely stable, and will withstand any significant fading upon exposure to the elements during a normal lifetime for a composition roof. Since there is no significant fading of roofing prepared according to the present invention, replacement of a few shingles or squares of a roof that is several years old may be done in an esthetically acceptable manner without replacing the entire roof.

EXAMPLE I

This example sets forth the preferred method for preparing permanently colored roofing granules.
Starting Material:
Copper Slap
General chemical composition of copper slag:

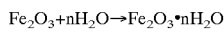

| Analyte | % by Weight |
|---------|-------------|
| Fe | 32.11 |
| $SiO_2$ | 38.92 |
| $Al_2O_3$ | 9.45 |
| CaO | 5.94 |
| MgO | 0.13 |
| S | 2.27 |
| $Na_2O$ | 0.13 |
| $K_2O$ | 0.17 |

Crushed to present base granules meeting the following size specifications:

| U.S. Std. Sieve | % Retained* Observed | Acceptable Range |
|---|---|---|
| 8 | 0.0 | 0–0 |
| 12 | 6.7 | 2–10 |
| 16 | 41.2 | 35–45 |
| 20 | 29.5 | 25–40 |
| 30 | 18.0 | 15–25 |
| 40 | 4.0 | 0–6 |

*percentages relate to amount of sample remaining after each successive screening step Procedure Copper slag of the preceding general chemical composition was crushed and sieved to yield base granules of the preceding size. The material was dried and the base granules were heated in a stationary muffle furnace. The following results were observed:

Results:
STATIONARY MUFFLE FURNACE

| Temp (° C.) | Time (minutes) | Color |
|---|---|---|
| N/A | 0 | Black (raw, unprocessed) |
| 550 | 5 | Slightly brownish black |
| 550 | 10 | Moderately brownish black |
| 550 | 20 | Brownish black |
| 650 | 5 | Blackish brown |
| 650 | 10 | Brown |
| 650 | 20 | Chocolate brown |
| 750 | 2 | Blackish brown |
| 750 | 5 | Brown |
| 750 | 10 | Chocolate brown |
| 750 | 20 | Deep chocolate brown |

At temperatures above 1,000° C. the granules began to fuse together and became dark purple in color.

EXAMPLE II

The procedure of Example I was repeated except that the granules were heated in a rotary kiln. One batch was heated in an atmosphere enriched with steam to produce granules with a reddish-brown color.

Results:
ROTARY KILN

| Temp (° C.) | Dwell Time (Minutes) | Steam | Color |
|---|---|---|---|
| 725–750 | 15 | No | Slightly reddish brown |
| 740–780 | 15 | Yes | Reddish brown |

In use, the roofing granules of the present invention may be applied as a surface coating to asphalt composition shingles, roll or other types of roofing substrates, including hot roofing materials using conventional methods. In one preferred method of use, granules (18) are applied to tab area (14) of shingle (10). In conventional shingle construction lap area (12) is covered with uncolored head lap granules.

Once applied to a substrate as a surface coating, the product roofing materials can be handled and installed using conventional methods. In one preferred method of installation, a first course of shingles (10) is installed. A second course is installed in an overlapping manner so that notches (16) are staggered and the granule-coated tab area (14) of the second course completely covers the uncoated lap area (12) of the first course.

Having described the preferred embodiments of the present invention, the following is claimed as new and desired to be secured by Letters Patent:

1. A method of preparing colored roofing granules from granulated mineral-containing matter comprising slag having an iron content of about 15% to about 70% by weight and being sized so that approximately 100% of said granulated matter will pass through a number 8 U.S. Standard Sieve and no more than approximately 2% will pass through a number 40 U.S. Standard Sieve, said method comprising the steps of:

heating said granules to a temperature of from about 450° C. to about 1000° C.; and maintaining said temperature for a period of time sufficient to cause oxidation of said iron to effect a color change in said granules and thereby form said colored roofing granules.

2. The method of claim 1, wherein said slag includes copper slag.

3. The method of claim 1, wherein oxygen is added during said heating step.

4. The method of claim 1, wherein water vapor is added during said heating step.

* * * * *